Oct. 9, 1951  H. ABRAHAM  2,570,626
ROOFING FASTENER
Filed March 6, 1947
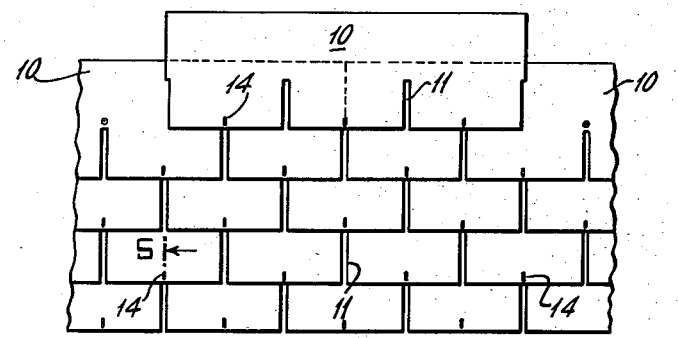
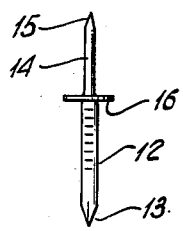
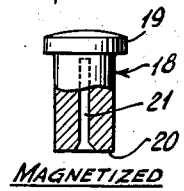
MAGNETIZED
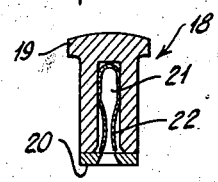
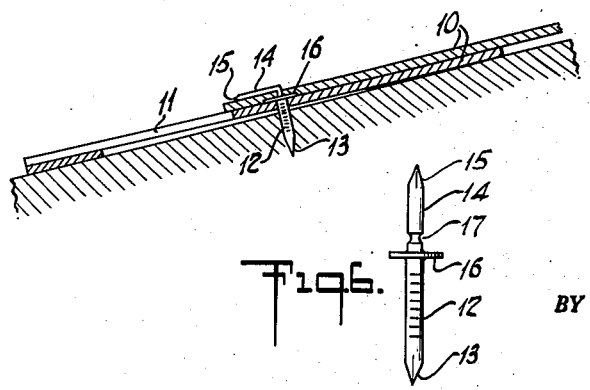
INVENTOR.
HERBERT ABRAHAM.
BY
ATTORNEY.

Patented Oct. 9, 1951

2,570,626

UNITED STATES PATENT OFFICE 2,570,626

ROOFING FASTENER

Herbert Abraham, New York, N. Y., assignor to The Ruberoid Co., New York, N. Y., a corporation of New Jersey Application March 6, 1947, Serial No. 732,797

2 Claims. (Cl. 108—33)

This invention relates to an improved roofing fastener, and more particularly to a device for fastening roofing elements, such as are commonly known as asphalt shingles, strip-shingles, and the like, made of flexible prepared roofing material.

The principal object is to provide a fastener for use both in securing a roofing element in position and clinching an overlapping portion of a second roofing element to the first.

The fastener, and its manner of use, are illustrated in the accompanying drawings, in which:

Fig. 1 is a plan view of a number of strip-shingles applied in overlapped relation with my improved fastener;

Fig. 2 is a view in elevation of one form of fastener;

Fig. 3 is a view in elevation, partly in section, of a driver or placer for use with the fastener;

Fig. 4 is a similar view of another form of driver or placer;

Fig. 5 is an enlarged sectional view taken on the line 5—5 of Fig. 1; and

Fig. 6 is an elevation of a modified form of fastener.

The fastener may be used with prepared roofing elements of any suitable form or shape, but for the purpose of illustration it is shown in the drawings as used in connection with strip-shingles 10 of the square-butt type which have vertical slots 11 in their exposed portions.

In the form shown in Fig. 2, the fastener consists of a shank 12 having a point 13 at its lower end, and a coaxial upwardly extending prong 14 having a sharp upper end 15. A thin flat collar or flange 16 is formed at the point of juncture of the shank and prong, and integral with the shank. The entire fastener may be made of a single piece of suitable metal, or the shank and prong portions may be made of two separate pieces welded or otherwise permanently joined together. The shank may be barbed if desired. The prong portion is of smaller diameter than the shank portion to permit of its being bent or clinched easily. The collar may be of substantially the same diameter as that of the head of an ordinary roofing nail.

The modified form of fastener shown in Fig 6 differs from the form above described in that the shank and prong portions are of the same, or substantially the same diameter, but in this instance the prong has a groove 17 of reduced diameter to permit of easy bending. The groove is located at the lower end of the prong adjacent to the collar, but preferably spaced upward therefrom a distance approximately equal to the thickness of a shingle.

In applying the fasteners, the shanks 12 are driven through the roofing element, in the case of square-butt strips they are driven through the material just above the slots, so as to nail the element to the roof deck. The exposed portions or butts of an element of the succeeding course are then pressed down on the prongs so that they will penetrate through the material, after which the prongs are bent downwardly, as shown in Fig. 5, to clinch those portions.

Because of its normally upright prong, the fastener cannot be applied by direct hammer blows. Accordingly, any suitable device may be employed to permit of setting the fastener. Two forms of device for this purpose are shown in Figs. 3 and 4 of the drawings. Each of these consist of a body 18 having a head 19 and a foot 20. The body is formed with a central longitudinal opening 21 for reception of the prong of the fastener. The device is placed over the prong with its foot resting on the flange of the fastener, and then the fastener may be set with a hammer. For convenience in handling the fasteners the device should preferably be of such construction as to hold the fastener temporarily in place in the device. To this end the device of Fig. 3 is made of magentized metal designed to hold the fastener in place by magnetic attraction, while the device of Fig. 4 is provided with a spring 22, or other resilient insert, that will releasably grip the prong.

The shank of the fastener has approximately the same stiffness and rigidity as the shank of an ordinary shingle or roofing nail, while the prong is relatively pliable so that the projecting portions thereof may be bent down easily under a hammer blow to clinch it against the element through which it is pierced. The flange of the fastener lies under the clinched element and thus provides a dam or obstruction against entry of moisture or water.

Modifications in the construction illustrated and described herein may be made within the scope of the invention defined in the claims.

What I claim is:

1. A metal fastener for flexible asphalt roofing shingles, comprising a rigid cylindrical shank portion pointed at its lower end and having a head at its upper end, said shank being adapted to be driven through a shingle into the roof deck, and a pliable cylindrical shank portion pointed at its upper end and extending upward from the head of the first mentioned shank in axial alignment with said shank, said pliable pointed shank being adapted to penetrate upward through an exposed portion of an overlying shingle and to be bent down thereupon to clinch it firmly in place, said rigid and pliable shank portions being permanently united to form a unitary structure.

2. A metal fastner for flexible asphalt roofing shingles, comprising a rigid cylindrical shank portion pointed at its lower end and having a head at its upper end, said shank being adapted to be driven through a shingle into the roof deck, and a pliable cylindrical shank portion of reduced diameter extending upward from the head of the first mentioned shank in axial alignment with said shank, said pliable shank being pointed at its upper end to penetrate upward through an exposed portion of an overlying shingle and to be bent down thereupon to clinch it firmly in place, said rigid and pliable shank portions being permanently united to form a unitary structure.

HERBERT ABRAHAM.

REFERENCES CITED

The following references are of record in the file of this patent:

UNITED STATES PATENTS

| Number | Name | Date |
| --- | --- | --- |
| 1,257,876 | Kenyon | Feb. 26, 1918 |
| 1,540,960 | Sherman | June 9, 1925 |
| 2,412,744 | Nelson | Dec. 17, 1946 |

FOREIGN PATENTS

| Number | Country | Date |
| --- | --- | --- |
| 14,716 | Great Britain | 1887 |
| 695,031 | France | Dec. 10, 1930 |